United States Patent
Bermundo (10) Patent No.: US 11,967,003 B2
(45) Date of Patent: Apr. 23, 2024

(54) ADAPTIVE COLOR SELECTION

(71) Applicant: KYOCERA Document Solutions Inc., Osaka (JP)

(72) Inventor: Neil-Paul Payoyo Bermundo, Glendora, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 42 days.

(21) Appl. No.: 17/750,340

(22) Filed: May 21, 2022

(65) Prior Publication Data

US 2023/0377216 A1  Nov. 23, 2023

(51) Int. Cl.
| | |
|---|---|
| G06T 11/00 | (2006.01) |
| G06T 7/50 | (2017.01) |
| G06T 7/90 | (2017.01) |
| G06V 10/70 | (2022.01) |
| G06V 20/60 | (2022.01) |

(52) U.S. Cl.
CPC .............. G06T 11/001 (2013.01); G06T 7/50 (2017.01); G06T 7/90 (2017.01); G06V 10/70 (2022.01); G06V 20/60 (2022.01); G06T 2200/24 (2013.01); G06T 2207/10024 (2013.01)

(58) Field of Classification Search
CPC  G06T 11/001; G06T 7/50; G06T 7/90; G06V 10/70; G06V 20/60
USPC ..................... 345/594, 601; 706/21; 707/772
See application file for complete search history.

(56) References Cited

U.S. PATENT DOCUMENTS

| | | | |
|---|---|---|---|
| 5,745,103 A * | 4/1998 | Smith ................. | G06F 3/04897 345/601 |
| 8,593,680 B2 | 11/2013 | Woolfe et al. | |
| 10,930,027 B2 | 2/2021 | Guido-Clark et al. | |
| 2015/0379005 A1* | 12/2015 | Dorner .................... | G06F 16/54 707/772 |
| 2020/0160612 A1* | 5/2020 | Bowen .................... | G06F 30/20 |
| 2020/0380060 A1* | 12/2020 | Siani Cohen .......... | G06N 3/044 |
| 2022/0335252 A1* | 10/2022 | Georgievskaya ...... | G06V 10/22 |
| 2023/0052590 A1* | 2/2023 | Suwanto ............ | G06Q 30/0621 |
| 2023/0127525 A1* | 4/2023 | Rai .......................... | G06N 3/08 706/21 |

OTHER PUBLICATIONS

Https://brandmark.io/color-wheel/ "AI Color Wheel" tool published and offered by Brandmark 2020.
Https://wersm.com/pantone-creates-a-card-to-match-colors-in-the-real-world/ 2020.

* cited by examiner

Primary Examiner — Prabodh M Dharia
(74) Attorney, Agent, or Firm — W. Eric Webostad (57) ABSTRACT

Systems and methods relate generally to drawing are disclosed. In one such method, an object on a page of a digital document is identified by an artificial intelligence determinator. The object is analyzed by the artificial intelligence determinator to determine a color palette in association with the object. The color palette is presented as a user interface for selection therefrom.

20 Claims, 8 Drawing Sheets

ADAPTIVE COLOR SELECTION

FIELD

The following description relates to adaptive color selection. More particularly, the following description relates to adaptive color selection responsive to image recognition.

BACKGROUND

Conventionally, a color wheel, such as an RYB (red-yellow-blue) color wheel for example, may be used to select colors from a computer display thereof. Other examples may be theme colors or standard colors obtained from a color wheel type selection menu or pull-down menu. Furthermore, in some implementations, custom RYB values may be input to generate a color. However, conventionally, these colors do not necessarily match a user context in creating a drawing, painting, or other computer-assisted generated image.

SUMMARY

In accordance with one or more below described examples, a method relating generally to drawing is disclosed. In such a method, an object on a page of a digital document is identified by an artificial intelligence determinator. The object is analyzed by the artificial intelligence determinator to determine a color palette in association with the object. The color palette is presented as a user interface for selection therefrom.

In accordance with one or more below described examples, a system relating generally to drawing is disclosed. In such a system, a host computational device has a memory configured to store program code, and a processor coupled to the memory. In combination and response to executing the program code, the host computational device is configured to initiate operations for implementing the drawing flow, including: Identifying an object on a page of a digital document by an artificial intelligence determinator; analyzing the object by the artificial intelligence determinator to determine a color palette in association with the object; and presenting the color palette as a user interface for selection therefrom.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. FIG. 1-1 is a flow diagram depicting an example of an intelligent color palette ("ICP") system process.

FIG. 1-2 is a block diagram depicting an example of an ICP system for a plug-in implementation.

FIG. 1-3 is a block diagram depicting an example of an ICP system for an integrated implementation.

FIGS. 2-1 through 2-3 are respective pictorial diagrams depicting examples of conventional color template interfaces, respectively.

FIG. 3-1 is a pictorial flow diagram depicting an example of an ICP workflow or drawing flow corresponding to ICP system process 100 of FIGS. 1-1 through 1-3.

FIG. 3-2 is block diagram depicting an example of an artificial intelligence (AI) color determinator engine.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Generally, a color palette is provided without association with an object on a display screen. A user may select a color from such palette or may input numbers for a custom color, which can be tedious.

As described below in additional detail, a color selection palette is provided with a selection of colors associated with an object on an active page being used by a user. This selection of colors facilitates a user to readily select colors association with such object.

With the above general understanding borne in mind, various configurations for systems, and methods therefor, with using a mobile device or a computer for color selection palette generation responsive to an object an active page are generally described below for providing printer job settings thereto.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 11:
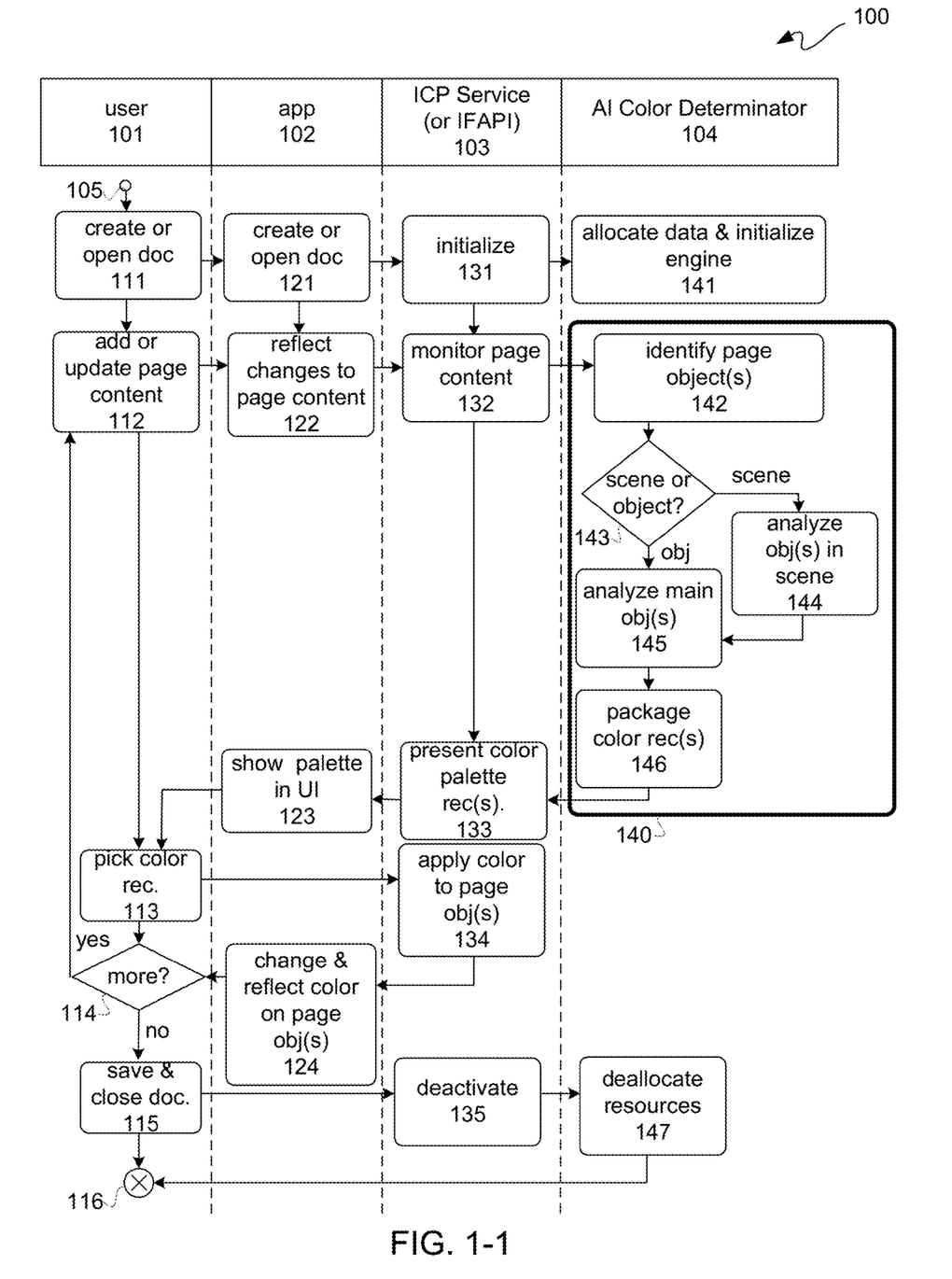

FIG. 1-1 is a flow diagram depicting an example of an intelligent color palette ("ICP") system process 100. For purposes of clarity by way of example and not limitation, ICP system process 100 is broken out into four sections of types of operations, namely by a user 101, an application or app 102, an ICP service 103, and artificial intelligence (AI) color determinator 104. System process 100 may be implemented using a host computer system, whether a notebook, desktop, tablet or other host computer system.

Figure 12:
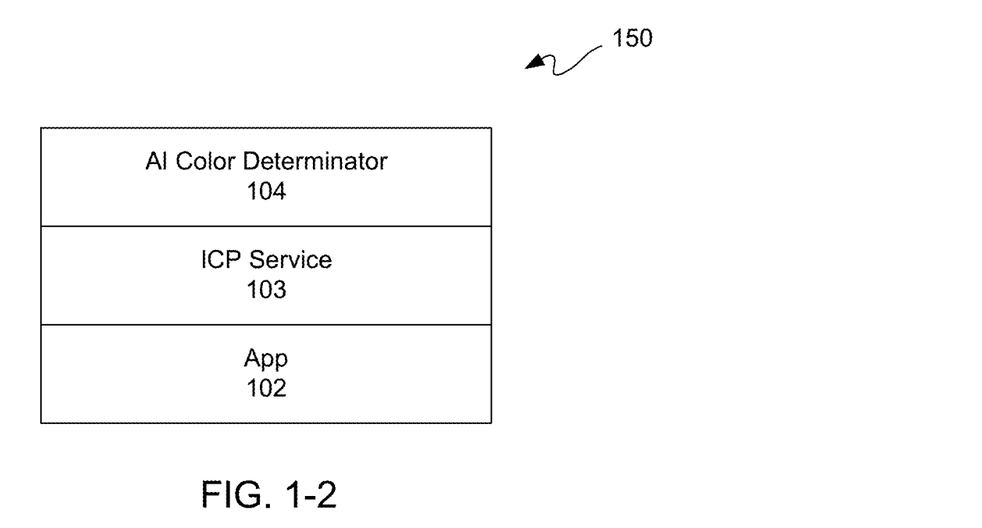

FIG. 1-2 is a block diagram depicting an example of an ICP system 150 for a plug-in implementation. Along those lines, ICP system 150 may include an application layer or app 102, an ICP service or ICP service layer 103, and an AI color determinator or AI color determination layer 104. In this example, ICP service 103 may be a plug-in. ICP service 103 may be situated in part in an application, such as app 102 in another example. However, in this example ICP service 103 is a service layer that serves as color palette selection interface to app 102.

Figure 13:
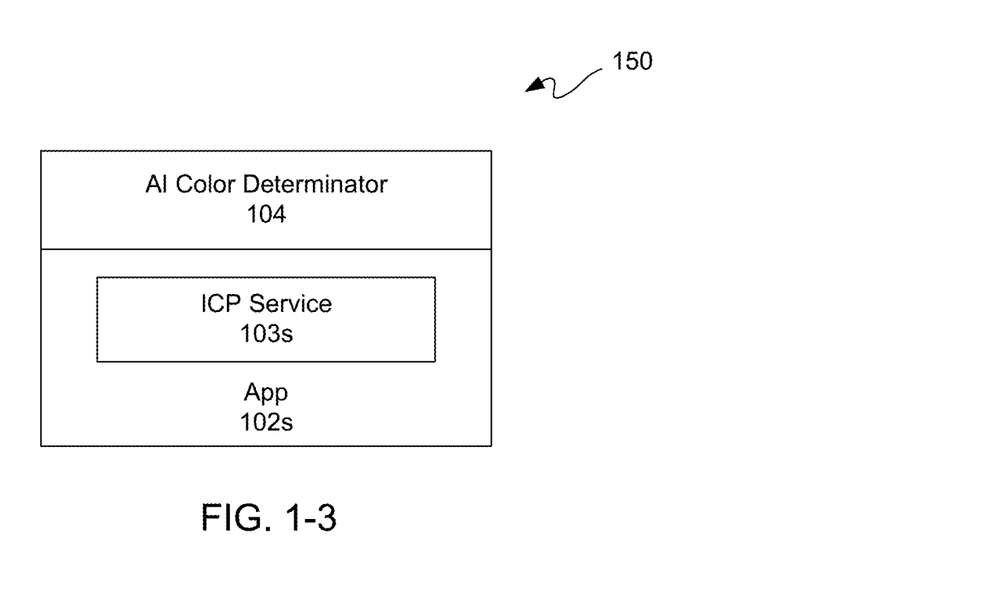

FIG. 1-3 is a block diagram depicting an example of an ICP system 150 for an integrated implementation. Along those lines, ICP system 150 may include an application layer or app 102$s$, an integrated ICP interface or interface layer 103$s$, and an AI color determinator or AI color determination layer 104. In this example, integrated ICP interface or interface layer 103$s$ may be an application programming interface (API). In this example, a color selection palette may be an integrated feature in app 102$s$. For example, a color selection palette may be implemented as a native or integrated feature in app 102$s$.

AI color determinator 104 may be a common component for both examples of FIGS. 1-2 and 1-3. AI color determinator 104 may provide an engine or "brain" to analyze page contents, images, shapes, or objects, to determine applicable colors and present recommendations to user.

For purposes of clarity by way of example and not limitation, ICP system 150 of FIG. 1-2 is further described with respect to ICP system process 100 of FIG. 1-1; however, in another example ICP system 150 of FIG. 1-3 may be used in ICP system process 100 of FIG. 1-1.

After initiation 105 by a user 101, a document may be created or opened at operation 111 by a user 101. In response, at operation 121 an app 102 may detect that such a document is being created or opened in response to operation 111.

At operation 131, an ICP service 103 may be initialized in response to operation 121. In response to initialization of an ICP service 103, an AI color determinator 104 may allocate data and other resources and may initiate an engine 140 for performing operations associated with generating one or more color palette recommendations as part of supervised AI.

After creating or opening a document, a user 101 may add a page or update content on a page at operation 112. At operation 122, an app 102 may reflect changes to page content in response to operation 112. Changes reflected at operation 122 by app 102 may be for a document created or opened at 121 by such app.

At operation 132, page content may be monitored by ICP service 103. After initializing at 131, ICP service 103 may trigger looking for changes made to page content, such as responsive to operation 122.

Operations 142 through 146 may be associated with an engine 140, where such engine may be initialized at operation 141 by AI color determinator 104. Such an engine may be part of such AI color determinator 104.

At operation 142, AI color determinator 104 may identify one or more page objects. Each of such page objects identified at operation 142 may be processed at 143 to determine if such objects are for a scene, such as background for example, or an image object of a page. Again, such a page may be of a document created or opened at 121.

If a page object is determined at 143 to be for a scene, then one or more objects of such scene may be analyzed by AI color determinator 104 at operation 144. Each of such scene or peripheral objects may be analyzed at operation 144.

If a page object is determined at 143 to be a main or primary object for a page in contrast to a scene page object by AI color determinator 104, then each of one or more main objects may be analyzed by AI color determinator 104 at operation 145. Operations 143 through 145 may be performed for each page of a document associated with operation 121. Along those lines, operation 111 may be avoided for batch processing of one or more documents starting at operation 121 for automatic coloring of such one or more documents.

At operation 146, color recommendations made by AI color determinator 104 may be packaged thereby. Though this example is generally described in terms of supervised AI, in another example rather than recommendations, color recommendations may be automatically implemented at operation 146. However, for purposes of clarity by way of example and not limitation, supervised AI is further described.

At operation 133, ICP service 103 may, for each page content monitored at operation 132, present one or more color palette recommendations packaged at operation 146. At operation 123, app 102 may display or show each of such palettes corresponding to such one or more recommendations. Such showing or displaying may be in a form a floating or pop-up graphic user interface (GUI) of app 102.

For each document opened or created with changed content from operation 112, a user at operation 113 may pick or select from color recommendations shown at operation 123. Again, each recommendation may be associated with an object, whether scenic or main, on a page.

For each page and one or more objects thereof, ICP service 103 may apply color selections to such one or more objects on such page at operation 134 responsive to one or more corresponding user selections at 113. At operation 124, app 102 responsive to operation 134 applications may change or adjust color and reflect such change or adjustment on each page for each one or more objects thereof.

While processing user selections from operation 113, at operation 114 a determination may be made whether there is another page to process at operation 113. If there is another page to process at operation 113 as determined at operation 114, then such page may be retrieved by a user at operation 112. In another example, pages may be automatically sequentially displayed at operation 113.

If a last page is processed at operation 124, then at operation 114 is may be determined that no more pages are to be processed responsive to user selection at operation 113. In response to such a determination at operation 114, at operation 115 a user may save and close a document at operation 115.

At operation 135 responsive to closing a document being processed, ICP service 103 may be deactivated. At operation 147, responsive to such deactivation at operation 135, AI color determinator 104 may deallocate resources at operation 147. At operation 116, after closing a document at operation 115 and deallocating resources at operation 147, ICP system process 100 may end or exit at operation 116.

Figure 21:
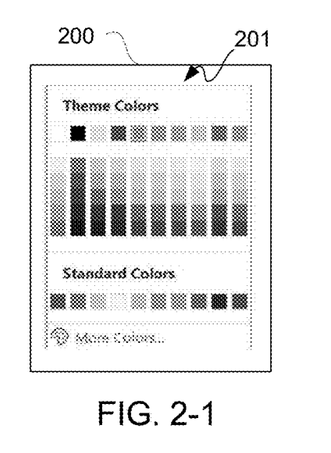
Figure 22:
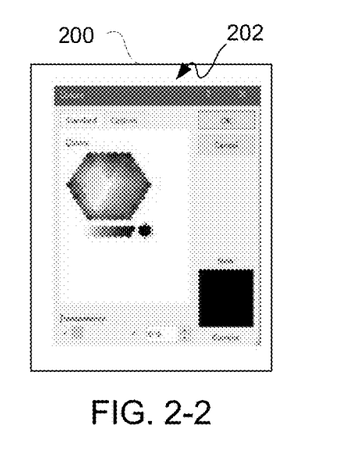
Figure 23:
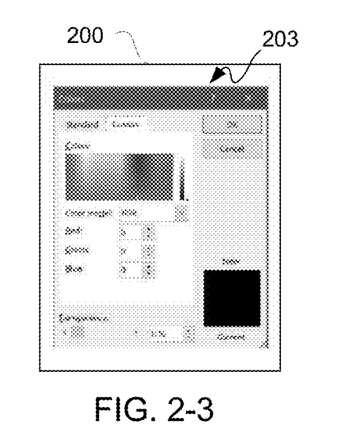

FIGS. 2-1 through 2-3 are respective pictorial diagrams depicting examples of conventional color template interfaces 201 through 203, respectively. While each of these conventional interfaces allow for a user to select colors from a computer display 200, such colors may not necessarily match a user context for an opened or created digital drawing, graphic or painting. For someone just starting to learn how to paint, or for professional artists who just like to save time, these conventional default coloring options may not be sufficient.

AI color determinator 104 of an ICP system may be configured to perform an analysis of color data gathered from a user's drawings or creations on a digitally displayed page. In response, AI color determinator 104 may determine and display color recommendations that may be applicable or relevant to one or more page objects(s).

ICP service 103, or an integrated feature layer instead thereof, may interact with an AI color determinator 104 component and relay color recommendations to app 102. ICP service 103, or an integrated feature layer instead thereof, may further make color changes on an affected page's object(s) responsive to a user making color selections via a floating or pop-up GUI. In another example, color selection and application thereof may be automatically performed by app 102. In other words, rather than user color selection via a GUI, such color selection may be by an ICP service or an integrated feature layer.

Figure 31:
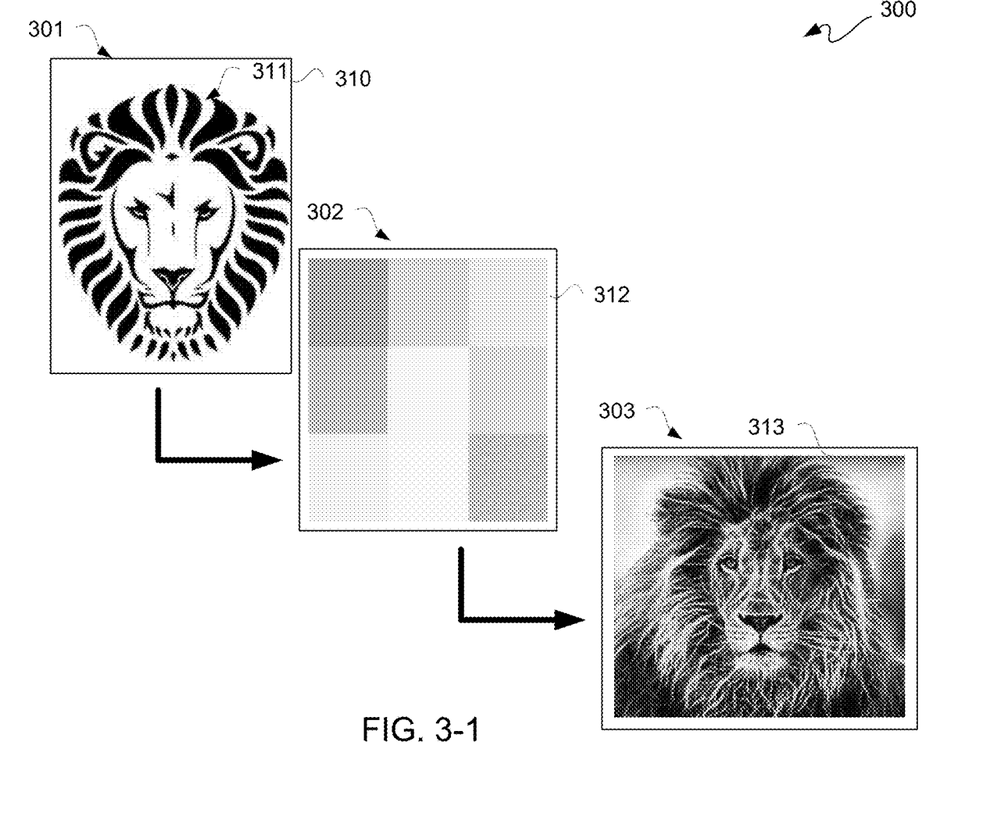

In contrast, FIG. 3-1 is a pictorial flow diagram depicting an example of an ICP workflow or drawing flow 300 corresponding to ICP system process 100 of FIG. 1-1. With simultaneous reference to FIGS. 1-1 and 3-1, ICP flow 300 is further described.

In this example, app 102 may be used to detect that a user 101 is currently drawing and use that data to suggest colors that would apply for that drawing, shape, figure, graphic or painting. In this example, at 301 a page 310 having a drawing 311 is illustratively depicted as it may be displayed on a display. For example, as a user creates a general outline of a lion (animal) or other image, AI color determinator 104 may be configured to detect that drawing 311 is the shape of an animal, specifically a cat or lion in this example. In response, when a user brings up a color selection palette or template ("color selection palette") 312 at operation 302, a user may see a palette that shows colors applicable to how a lion would be colored.

Each color selection palette 312 presented to a user via app 102 may show color choices that can be used to add volume, fill, body, or content to artwork, image, outline, chart, diagram, or shape that is being created, drawn, modified, uploaded, or viewed. Color selection palette 312 may be used to modify color of brush, pen, pencil, or other drawing tool that a user is using to complete a digital drawing, painting, or artwork.

Though shown in shades of gray, in an implementation such a color selection palette 312 may display different shades of brown, gold, orange, black, gray and without blue, green, pink and the like corresponding to a lion. A full color wheel may still be shown but it is not what may be presented at first to a user. A full color wheel selection may be accessed through an advanced option or menu. Along those lines, a user may not immediately be presented with an advanced or full color selection but instead may see a recommended color selection palette 312 as determined by AI color determinator 104. At operation 303, drawing 311 may be displayed with either or both user selected coloring from color selection palette 312 or color selection determined by AI color determinator 104 without user intervention. Along those lines, color selection palette 312 may be displayed in association with an object, such as for example image 313.

As a user applies more colors and adds more parts, shapes, or drawings on a page on a screen, the set of recommended colors may be amended by AI color determinator 104 to reflect what colors are applicable to a page object (e.g., a lion in this example) being drawn. AI color determinator 104 may automatically present a user with colors that are more relevant or applicable to a page object (e.g., lion in this example) being drawn. In a digital painting with varying shapes, objects or figures, a color selection palette 312 displayed or otherwise presented to user may be toggled, adapted or adjusted as a user moves from one shape, object, or figure to another. An adaptive color selection interface, such as color selection palette 312 for example may save users time in selecting relevant colors. Along those lines, a color selection palette 312 as used herein may be a user interface for selection of one or more colors or tints to be used when filling or stroking shapes or markings on a page.

A color selection palette 312 may be part of a plug-in or an integrated feature in a document editing application, such as app 102 for example. However, an AI component of operation for use of such a plug-in or integrated feature, namely detection of drawn shapes, figures or objects on a page in real time may be provided by AI color determinator 104. Additionally, AI color determinator 104 may be configured to perform analysis to identify a drawn item and come up with a corresponding color selection palette 312, such as with one or more complementary colors.

Furthermore, a user may customize a color selection palette 312 for a scene or an object. Accordingly, a color selection palette 312 may be selected by an AI color determinator 104 responsive to a default or custom version thereof for an artist's interpretation.

An AI color determinator 104 component may receive data from an underlying plug-in service or integrated feature interface, as previously described. AI color determinator 104 may be configured to analyze such data to come up with color recommendations for presenting them in a color palette user interface, such as for example a color selection palette 312.

FIG. 3-2 is block diagram depicting an example of an AI color determinator engine 140. Engine 140 may be implemented as an AI color determinator 104, and thus is further described with simultaneous reference to FIGS. 1-1 through 1-3, as well as FIGS. 3-1 and 3-2.

Figure 32:
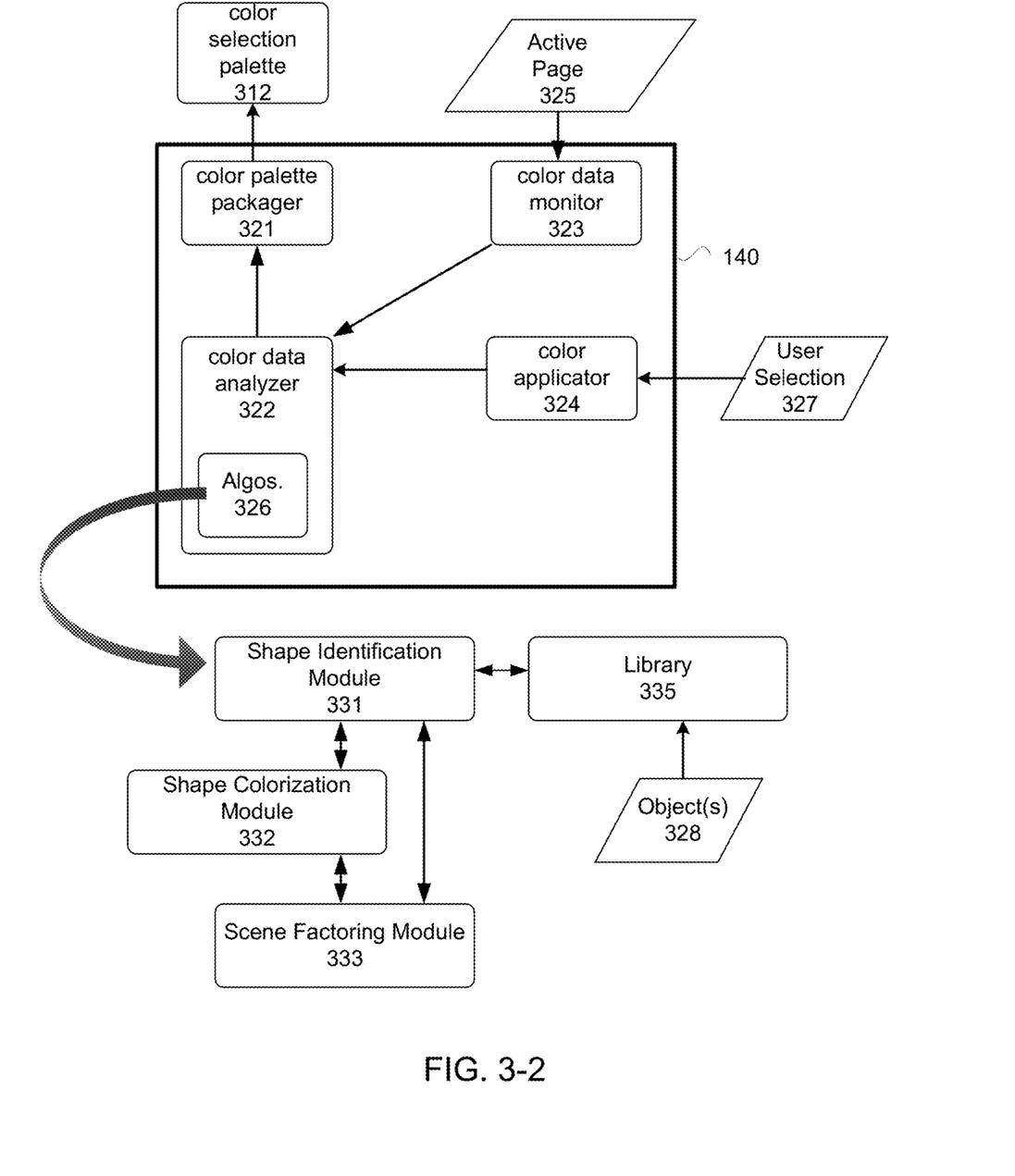

Engine 140 may include a color palette packager 321, a color data analyzer 322, a color data monitor 323, and a color applicator 324. Color packet packager 321 may be configured to create or generate each color palette user interface, such as for example a color selection palette 312, to be displayed or otherwise shown to a user. Color packet packager 321 may dynamically respond to each user selection 327 made from a color selection palette 312, such as to add or modify for example content in a current or active page of a document as described below in additional detail. Color packet packager 321 receives color data analyzer 322.

Color data monitor 323 may be configured to gather shapes, paths, images, or data in a page, such as an active page 325. Along those lines, color data monitor 323 may be configured to gather page data, which may be collectively considered page objects. Such page objects can be principal objects or scenic objects of a page. Color data monitor 323 may be configured to gather color information used for page objects gathered from a currently active or open page 325.

Any changes to page objects may be detected and monitored by color data monitor 323. Color data monitor 323 may take in information from a currently active page 325 and share such information with color data analyzer 322.

Color data analyzer 322 may be configured to receive data from color data monitor 323 and then analyze such data as described below in additional detail. Along those lines, color data analyzer 322 may be configured with a plurality of algorithms 326 to determine color recommendations for a combination of data being analyzed. Such algorithms include a shape identification module 331, a shape colorization module 332, and a scene factoring module 333. Color data analyzer 322 may be configured to gather each set of color recommendation data for an object for presenting to a user for packaging by color palette packager 321.

Shape identification module 331 may be configured to use a path, a shape, an image, or page markings to identify each page object. Shape identification module 331 may be configured to identify each page object from a known library 335 of objects, such as for example a certain plant, fruit, animal, structure, machine, or human. Such a library 335 may be organized as with general categories such as for example "animal", "plant", "fruit", "building", "book", "magazine", "computer", and the like. Such each such general category may be further categorized into more specific identification, such as for example "poodle", "goldfish", "lion", "cat", "apple", "rose", "male person", "laptop", "iPad", "iPhone", "fist", "hand", "leg", and the like. Shape identification module 331 may use image recognition to identify a page object.

In another example, shape identification module 331 may be configured to be dynamic by position. For example, depending on where a user moves around a cursor in scene, either through mouse, touch, or area selection, shape identification module 331 may be configured to focus on the specific shape or page object enclosing an area, mouse-pointer, or touched shape on such a page. Area selection may be a free-style selection of any area in a page or using a rectangular or other shape that can be resized and adjusted to enclose a specific area in the page.

Shape colorization module 332 may be configured to identify applicable colors of a shape identified by shape identification module 331. Shape colorization module 332 may be configured to factor in scene objects to add one or more additional color recommendations.

Scene factoring module 333 may be configured to use scene information around or responsive to shape identification from shape identification module to identify applicable colors to recommend.

For various objects, the following examples of recommendations are provided for purposes of clarity by way of example and not limitation. For example, if a fruit is on a tree, it may be green or not yet ripe; if a fruit is on the tray or table, it may be ripe and provide colors for ripe fruit for the specific identified fruit. Examples of recommended colors for example may be: red for a gala apple; bright orange for an orange; yellow and green tints for pineapple; and bright red for a strawberry. For the above example, if a lion is a cub, scene factoring module 333 may provide light brown or light golden color; or if a lion is older, provide darker brown shades. Furthermore for example, if the time-of-day is morning, a recommendation may be to provide blue and hazy colors; if the time-of-day is night, a recommendation may be to provide grayer colors; or if in a forest, a recommendation may be to provide browns, grays, greens, depending on the objects or shapes in a scene.

Color applicator 324 may be configured to apply a user's selected color 327 to a page object. Color applicator 324 may be configured to relay a selected color to app 102 such as via color data analyzer 322 to color palette packager 321 to cause such color to be applied to one or more page objects. In this example, color applicator 324 is an integral component in AI color determinator 104. However, in another example, color applicator 324 may reside in ICP service 103 or ICP integrated feature of an API layer 103s.

In another example, library 335 may be uploaded with one or more pre-made objects 328, such as for example images, shapes, pictures, charts, diagrams, figures, drawings or outlines. Such uploaded objects 328 may be presented to a user such as via a color selection palette 312 provided via app 102, including color choices that a user can use to modify, enhance, or improve such presented uploaded objects. One or more of such objects may be a user's original artwork. In another example, such uploaded objects may be editable, such as for example an editable image by application of one or more user choices from a presented color selection palette 312. Such uploaded image may be loaded and opened in app 102 with a UI therefor or an ICP compatible application.

To recapitulate in part, inputs may be outlines, figures, lines, charts, diagrams, or shapes that an ICP system may identify using AI. Such inputs may be grouped together as "shapes" for identification by an AI component. Such AI component described herein may identify whether a shape is that of a fruit, animal, plant, building, machine, among other objects. Such an ICP system may identify a shape as specific parts of general categories, such as a nose as part of a face, or a leaf as part of a tree, or a roof as part of a building, among many other possible examples. In an example, an ICP system as described herein may identify a shape as a diagram, chart, table and so on. Afterwards, such ICP system may recommend what colors may be applicable to such identified shape.

Further, an ICP system as described herein may adapt to a user's alterations or modifications to an object input, such as for example a shape. When a user adds more lines or colors to such a shape being drawn, an ICP system as described herein may provide more or less numbers of colors, depending on what may be applicable to such shape. For example, initially, a circle is nothing more than a shape, and all colors may apply to it. But if such "shape" becomes the face of a lion, for example, after a user adds ears, eyes and nose, then a color selection palette 312 may be dynamically adapted in response to show colors applicable to that of an animal, particularly a lion's face.

Input to an ICP system as described herein of objects, such as shapes, and such use of shapes, which may have or not have colors. Such ICP system identifies what colors may be applicable to such shapes, and color palettes may be presented in association with colors to use for each of identified shapes. Such colors presented may not necessarily be the same colors used by a user when such shape was initially drawn. Such shape may have been initially drawn using black, and an ICP system as described herein may suggest other colors that may be applicable to such shape.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
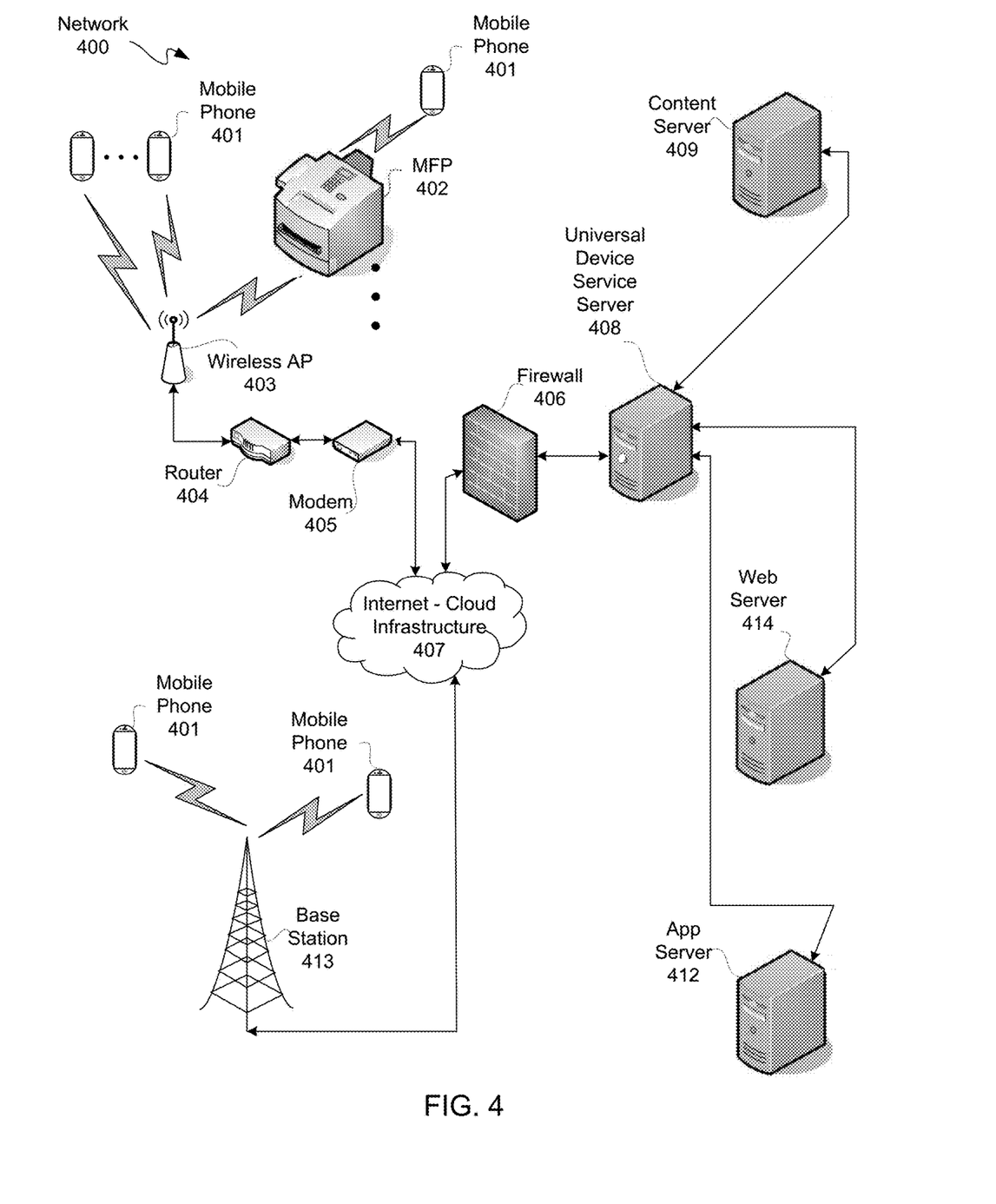
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
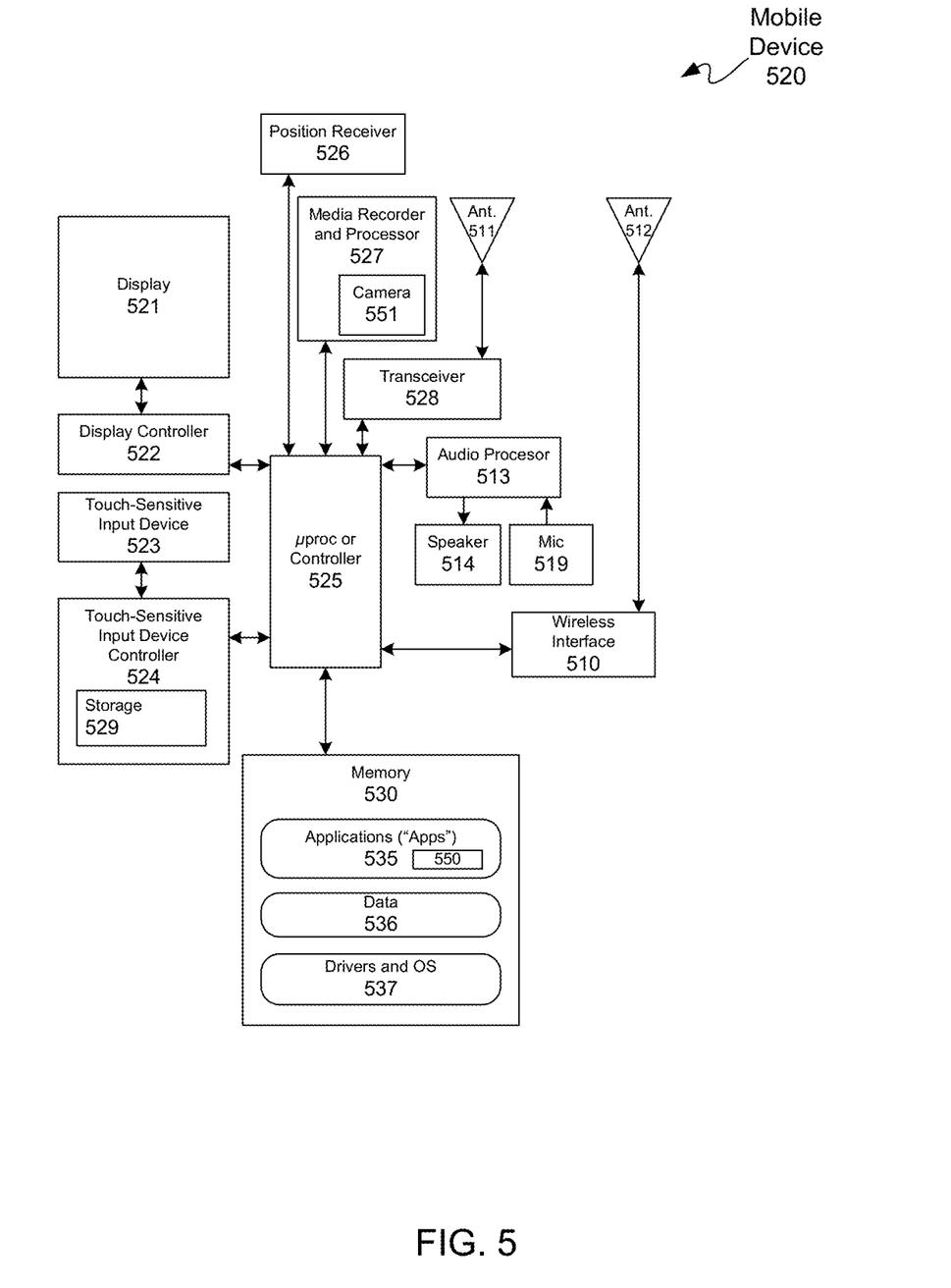
FIG. 5 is block diagram depicting an example of a portable communication device.

FIG. 5 is block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an app 550 for capturing a QR code and converting such QR code into an NFC message, as well as storing one or more QR codes or NFC messages, as described above in additional detail.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
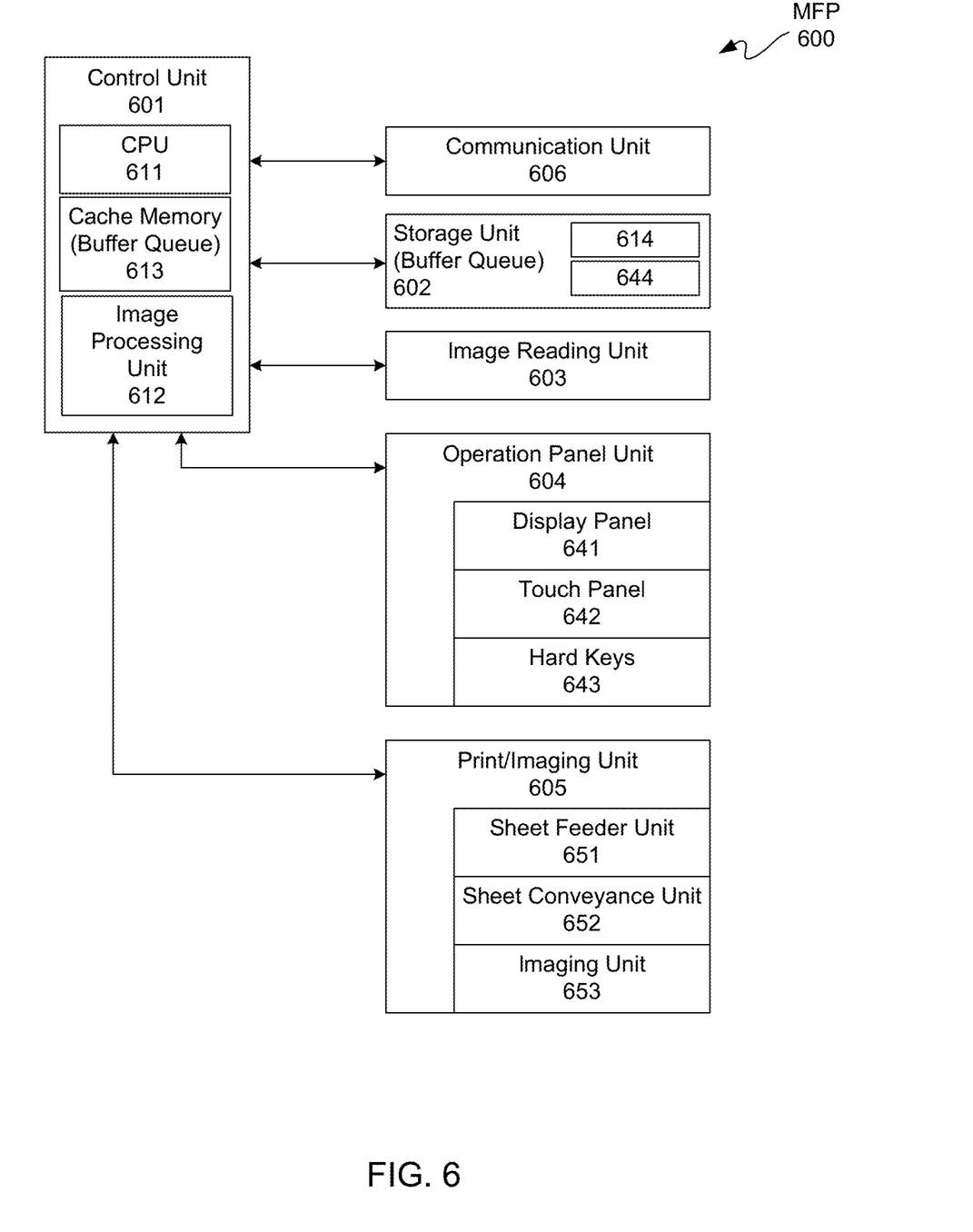
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and an NFC printer job settings app 644, as described above in additional detail. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
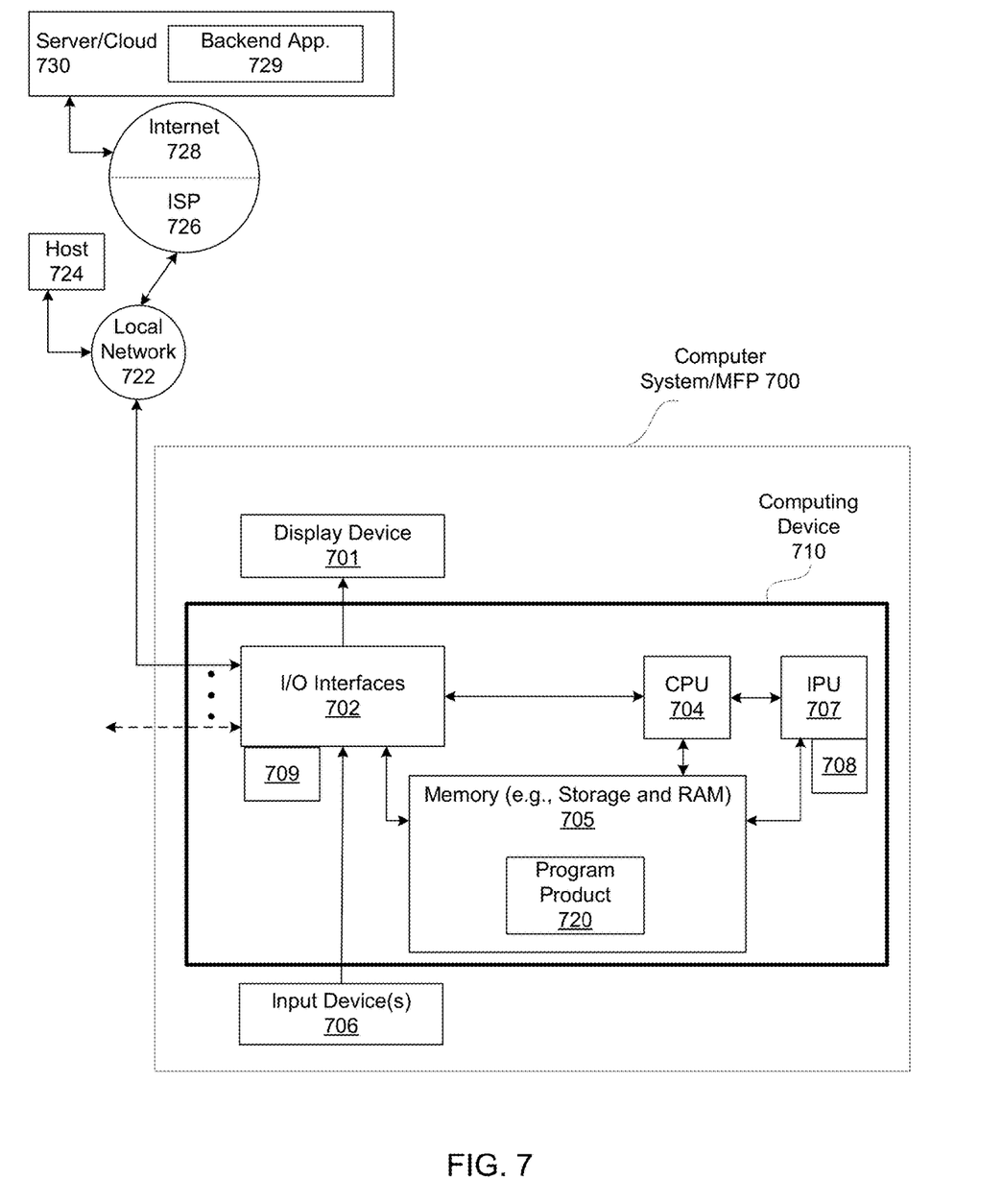
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. For example, program product 720 may include a printer driver as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for drawing, comprising:
    identifying an object on a page of a digital document by an artificial intelligence determinator;
    analyzing the object by the artificial intelligence determinator to determine a color palette in association with the object;
    presenting the color palette as a user interface for selection therefrom;
    determining whether the object is either a primary object on the page or a scenic object on the page;
    displaying the color palette in the user interface in association with the object;
    changing coloring of the object responsive to selection of a color of the color palette;
    initializing a service responsive to opening of the digital document; and
    allocating data and initializing an engine of the artificial intelligence color determinator;
    wherein the service is a plug-in.

2. The method according to claim 1, wherein the service is integrated via an application programming interface.

3. The method according to claim 1, wherein the engine includes a color palette packager, a color data monitor, a color data analyzer, and a color applicator.

4. The method according to claim 3, further comprising:
    monitoring the page with the color data monitor;

passing page information for the page from the color data monitor to the color data analyzer;

determining identification of a shape for the object by the color data analyzer;

determining a colorization of the shape by the color data analyzer; and factoring a scene of the page by the color data analyzer.

5. The method according to claim 4, further comprising:

providing color information for the shape from the color data analyzer to the color palette packager; and packaging the color information as the color palette for the user interface.

6. A system, comprising:

a host computational device having:
  a memory configured to store program code; and
  a processor coupled to the memory;

wherein, in combination and response to executing the program code, the host computational device is configured to initiate operations for implementing a drawing flow, including:

identifying an object on a page of a digital document by an artificial intelligence determinator;

analyzing the object by the artificial intelligence determinator to determine a color palette in association with the object;

presenting the color palette as a user interface for selection therefrom;

allocating data and initializing an engine of the artificial intelligence color determinator;

monitoring the page with a color data monitor of the engine;

passing page information for the page from the color data monitor to a color data analyzer of the engine;

determining identification of a shape for the object by the color data analyzer;

determining a colorization of the shape by the color data analyzer; and factoring a scene of the page by the color data analyzer.

7. The system according to claim 6, wherein the drawing flow further includes determining whether the object is either a primary object on the page or a scenic object on the page.

8. The system according to claim 7, wherein the drawing flow further includes displaying the color palette in the user interface in association with the object.

9. The system according to claim 8, wherein the drawing flow further includes changing coloring of the object responsive to selection of a color of the color palette.

10. The system according to claim 9, wherein the drawing flow further includes initializing a service responsive to opening of the digital document.

11. The system according to claim 6, wherein the engine further includes a color palette packager and a color applicator.

12. The system according to claim 11, wherein the drawing flow further includes:

providing color information for the shape from the color data analyzer to the color palette packager; and packaging the color information as the color palette for the user interface.

13. A method for drawing, comprising:

identifying an object on a page of a digital document by an artificial intelligence determinator;

analyzing the object by the artificial intelligence determinator to determine a color palette in association with the object;

presenting the color palette as a user interface for selection therefrom;

allocating data and initializing an engine of the artificial intelligence color determinator;

monitoring the page with a color data monitor of the engine;

passing page information for the page from the color data monitor to a color data analyzer of the engine;

determining identification of a shape for the object by the color data analyzer;

determining a colorization of the shape by the color data analyzer; and factoring a scene of the page by the color data analyzer.

14. The method according to claim 13, further comprising determining whether the object is either a primary object on the page or a scenic object on the page.

15. The method according to claim 14, further comprising displaying the color palette in the user interface in association with the object.

16. The method according to claim 15, further comprising changing coloring of the object responsive to selection of a color of the color palette.

17. The method according to claim 16, further comprising initializing a service responsive to opening of the digital document.

18. The method according to claim 17, wherein the service is integrated via an application programming interface.

19. The method according to claim 13, wherein the engine further includes a color palette packager and a color applicator.

20. The method according to claim 19, further comprising:

providing color information for the shape from the color data analyzer to the color palette packager; and packaging the color information as the color palette for the user interface.

* * * * *